United States Patent [19]

Kuroda et al.

[11] 4,098,939

[45] Jul. 4, 1978

[54] SUBSTRATE ASSEMBLY FOR A LUMINESCENT DISPLAY PANEL HAVING FIRED LIQUID GOLD LAYERS FOR SEGMENTED DISPLAY ELECTRODES

[75] Inventors: Toshiro Kuroda; Susumu Kakami, both of Aichi, Japan

[73] Assignee: Narumi China Corporation, Aichi, Japan

[21] Appl. No.: 688,900

[22] Filed: May 21, 1976

[30] Foreign Application Priority Data

May 22, 1975 [JP] Japan .................................. 50-61563
Aug. 22, 1975 [JP] Japan .................................. 50-102292

[51] Int. Cl.[2] .............................. B32B 3/00; B32B 7/14

[52] U.S. Cl. ...................................... 428/201; 428/209; 428/210; 428/328; 428/336; 428/433; 428/457; 428/917; 427/64; 427/71

[58] Field of Search .............................. 427/64, 71, 96; 428/328, 332, 432, 433, 434, 469, 472, 539, 201, 209, 210, 336, 328, 432, 457, 901, 917

[56] References Cited

U.S. PATENT DOCUMENTS

| | | | |
|---|---|---|---|
| 2,900,271 | 8/1959 | MacIntyre et al. | 428/917 X |
| 3,018,191 | 1/1962 | Caban et al. | 428/434 |
| 3,368,919 | 2/1968 | Casale et al. | 428/469 X |
| 3,394,031 | 7/1968 | Ramm | 428/917 X |
| 3,650,824 | 3/1972 | Szepesi et al. | 428/917 X |
| 3,668,005 | 6/1972 | Sluse et al. | 428/469 X |

*Primary Examiner*—George F. Lesmes
*Assistant Examiner*—R. Eugene Varndell, Jr.

[57] ABSTRACT

A substrate assembly for a fluorescent or phosphorescent display panel comprises a layer of fired liquid gold, preferably three microns or less thick, for each of segmented display electrodes. The layer is in direct contact with an insulator substrate and with a mass of a luminescent material and may be an integral part of a lead for the electrode or electrodes. Alternatively, the layer may be formed on a resistive layer comprising powder of ruthenium (IV) oxide and formed, in turn, on the substrate with a conductive layer interposed for providing an electric connection to the lead.

14 Claims, 11 Drawing Figures

X 2,000

X 10,000

X 2,000

X 10,000

X 2,000

X 2,000

SUBSTRATE ASSEMBLY FOR A LUMINESCENT DISPLAY PANEL HAVING FIRED LIQUID GOLD LAYERS FOR SEGMENTED DISPLAY ELECTRODES

BACKGROUND OF THE INVENTION

This invention relates to a substrate assembly for a fluorescent or phosphorescent display panel.

A fluorescent or phosphorescent display panel, namely, a luminescent display panel as generally referred to herein, comprises a substrate assembly comprising, in turn, a substrate of an electrically insulating material, a plurality of segmented electrodes on the substrate, masses of a luminescent material on the segmented electrodes, respectively, and a plurality of electroconductive leads for the segmented electrodes also on the substrate. Each segmented electrode is generally formed in an indentation formed in the substrate in a shape corresponding with the luminescent mass disposed therein and on the segmented electrode so as not to protrude outwardly of the general surface of the substrate. The expression "on the substrate" should therefore be understood to mean that the electrodes and luminescent masses do not necessarily protrude from the general substrate surface. Each segmented electrode and the luminescent mass placed thereon form a display electrode. The substrate may comprise a plurality of substrate layers.

It has been the practice to form the segmented electrodes and the electroconductive leads by firing prints on the substrate of silver or silver-palladium paste at about 600° C, particularly when the substrate is made of glass. The segmented electrodes and conductive leads are consequently about ten microns thick. The segmented electrodes thus formed are incapable of making the luminescent masses luminesce to their fullest brightness. A layer of graphite is therefore interposed between each segmented electrode and the luminescent mass as will later be illustrated with reference to one of the figures of the accompanying drawing. The graphite layer, however, does not adhere tenaciously to the underlying segmented electrode. The adhesion is enhanced by addition to the graphite of a glassy adhesive although brightness is somewhat reduced thereby, especially when the adhesive comprises lead glass that is excellent insofar as adhesion is concerned. The graphite layer is further objectionable because it comes off together with the luminescent mass when it is necessary to remove a luminescent mass that is inadvertently wrongly formed on the graphite layer. In addition, the thickness of about ten microns is undersiredly thick when a layer of an insulating material should be deposited on at least portions of the conductive leads.

The segmented electrodes and the conductive leads have alternatively been formed of tungsten or molybdenum by resorting to metallization techniques specifically when the substrate is made of ceramics. During metallization, the tungsten or molybdenum is inevitably activated in a hydrogen atmosphere to be readily contaminated either during storage of the substrates for subsequent use or during manufacture of the display panels. It is therefore necessary to plate the metallized electrodes and leads with gold as will also be described with reference to the above-mentioned one figure.

SUMMARY OF THE INVENTION

It is therefore an object of the present invention to provide a substrate assembly for a luminescent display panel, which comprises no graphite layer and may not comprise a plated gold layer.

It is another object of this invention to provide a substrate assembly of the type described, capable of making the display panel give a brightest possible display.

In is still another object of this invention to provide a substrate assembly of the type described, wherein the thickness of segmented electrodes and electroconductive leads is appreciably thinner than the conventional one.

It is yet another object of this invention to provide a substrate assembly of the type described, with which it is possible to reduce loss of the assemblies.

A substrate assembly for a luminescent display panel to which this invention is applicable comprises an insulator substrate, segmented electrodes, masses of a luminescent material, and electroconductive leads as set forth at the beginning of the instant specification. In accordance with this invention, each of the segmented electrodes comprises an electrode layer of fired liquid gold. Most preferably, each electrode layer is in direct contact with a luminescent mass.

DESCRIPTION OF THE PREFERRED EMBODIMENTS

Figure 1:
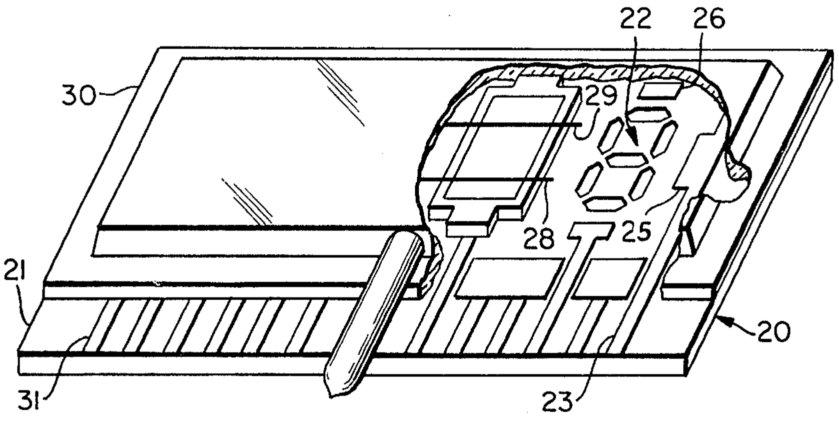
FIG. 1 schematically shows, with parts cut away, a perspective view of a luminescent display panel to which the present invention is applicable.

Referring to FIG. 1, a luminescent display panel comprises a substrate assembly 20 comprising, in turn, a substrate 21 of an electrically insulating material, such as glass, alumina, for sterite, or other ceramics, a plurality of display electrodes 22 on the substrate 21, and a plurality of electroconductive leads 23 also on the substrate 21. In the example being illustrated, the display electrodes 22 are arranged in a substantially figure-of-eight configuration and in a plurality of groups, each for a selected one of the numerals 0 to 9. The substrate assembly 20 further comprises a pair of cathode supports 25 connected to two of the conductive leads 23, respectively, and a plurality of pairs of grid supports 26, each pair being for a group of the display electrodes 22 and connected to one of the conductive leads 23. A grid 28 is attached to each pair of the grid supports 26 to cover a relevant one of the display electrode groups. At least one hot cahtode 29 is extended above the grids 28 and attached at both ends to the cathode supports 25. The substrate assembly 20 with the grids 28 and cathode 29 attached thereto is hermetically sealed to a glass cover plate 30 with the display electrodes 22, the grids 28, and the cathode 29 disposed in a hermetically sealed space.

As shown, the conductive leads 23 are extended outwardly of the sealed space to serve as external leads 31 for supplying a heater voltage and a cathode potential to the cathode 29 and for selectively supplying a grid voltage to the grids 28 and also the display electrodes 22 with a potential that is positive with respect to the cathode potential. As is known in the art, the substrate assembly 20 may be enclosed with a vacuum envelope (not shown) together with the cathode 29 and grids 28 supported by the envelope.

Figure 2:
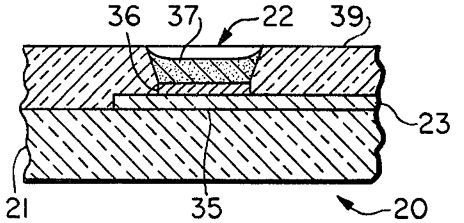
(PRIOR ART) FIG. 2
FIG. 2 is a schematic enlarged partial sectional view of a conventional substrate assembly for a luminescent display panel, such as shown in FIG. 1.

Referring to FIG. 2, each display electrode 22 of a conventional substrate assembly 20 comprises a segmented electrode 35 provided by a part of the electroconductive lead 23 therefor, a graphite or a plated gold layer 36 mentioned in the preamble of the instant specification, and a mass of a luminescent material 37 deposited on the graphite or plated gold layer 36. A sheet of glass 39 overlying the substrate 21 is the layer of an insulating material mentioned also in the preamble and may be formed by printing a glassy material and subsequently firing the print at about 600° C before formation of the graphite or plated gold layer 36. The above-mentioned substrate 21 and the overlying insulator sheet 39 may be deemed as a two-layer composite substrate although this is not necessarily the case. The conventional substrate assembly 20 has various defects pointed out hereinabove. Furthermore, the graphite layer 36 is not sufficiently adherent to the overlying sheet 39 unless either an objectionably large amount of the glassy adhesive is used to adversely affect the brightness-enhancing capability of the graphite layer 36 or a glassy adhesive comprising lead glass is used to harm the electron emissivity of the hot cathode 29 gradually during use of the display panel and to thereby again reduce the brightness of the display.

Figure 3:
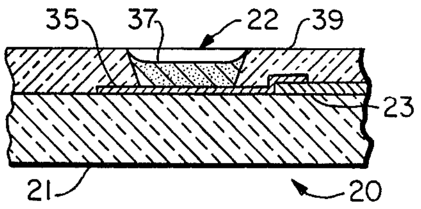
FIG. 3 is a schematic enlarged fragmentary sectional view of a substrate assembly according to a first embodiment of this invention for a luminescent display panel, such as illustrated in FIG. 1.

Referring now to FIG. 3, a substrate assembly 20 according to a first embodiment of the present invention comprises a segmented electrode 35 formed solely of an electrode layer of fired liquid gold in direct contact with the substrate 21. As shown, the fired liquid gold layer is formed partly on an electroconductive lead 23 for the segmented electrode 35. A mass of a luminescent material 37 is deposited directly on the fired liquid gold layer. The conductive leads 23 are formed in a conventional manner by firing prints of silver or silver-palladium paste at about 600° for both a glass and a ceramic substrate 21.

As described by Kenneth Shaw in a book entitled "Ceramic Colours and Pottery Decoration" and published 1962 by MacLaren & Sons Ltd., London, the United Kingdom, pages 69 to 74, "liquid gold" per se is known in the art of pottery and comprises an organic compound of gold and a vehicle therefor. As detailed in the book cited, gold resinate for use as an organic gold compound is prepared by producing gold chloride at first by dissolving gold in aqua regia. In the meantime, sulphur balsam is produced by subjecting sulphur, turpentine oil, and turpentine to reaction. The gold chloride and sulphur balsam are dissolved in chloroform and neutralized with sodium carbonate. Afer filtration, the filtrate is condensed. Methanol is added to the condensed filtrate to produce precipitates of gold resinate, which is separated from the mother liquor by filtration, rinsed, and subsequently dried. The gold resinate is mixed with a vehicle therefor together with resinates of bismuth, chromium, and rhodium to produce liquid gold. the vehicle may comprise ethylcellulose or nitrocellulose. In place of gold resinate, use may be made of any other organic gold compound miscible with a vehicle, such as gold mercaptide prepared by subjecting gold chloride and thioborneol to reaction with methanol. Firing is carried out at about 600° C. Bismuth is added in order to strengthen the adhesion of the fired liquid gold to the substrate 21. Chromium is added to avoid aggregation of gold particles in the fired liquid gold layer. Rhodium is added to prevent the gold particle aggregation and to provide a fine luster to the electrode layer.

Figure 4:
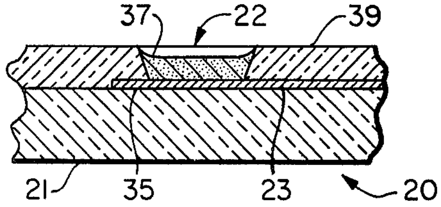
FIG. 4 is a similar view of a substrate assembly according to a second embodiment of this invention.

Referring to FIG. 4, a substrate assembly 20 according to a second embodiment of this invention comprises a segmented electrode 35 formed of an electrode layer of fired liquid gold alone as an integral part of the associated electroconductive lead 23. It will readily be understood that the segmented electrodes 35 and the conductive leads 23 are simultaneously formed directly on the substrate 21 by coating with liquid gold those surface areas of the substrate 21 which correspond in shape to the electrodes 35 and leads 23 and thereafter firing the liquid gold.

As will be appreciated from the description of the first and second embodiments of this invention, it is possible in accordance with this invention to manufacture stable substrate assemblies 20 with simple processes by the use of liquid gold known and used per se in the art of pottery. It has additionally and quite unexpectedly confirmed that the fired liquid gold layers tenaciously adhere to both the substrate 21 and, if any, the overlying insulator sheet 39 to make it possible to remove only the masses of luminescent material 37 if desired, that the luminescent masses 37 provide a brightest possible display without the use of the conventionally interposed graphite layers 36 (FIG. 2), that the fired liquid gold layers are less expensive and formed in a cleaner state than the conventional plated gold layers 36 (FIG. 2), or that the fired liquid gold layers are only about three microns or less thick and can be made even thinner than about one micron.

The substrate assemblies 20 according to the second emboiment are preferred to those according to the first embodiment in that migration of silver which is still unavoidable in a luminescent display panel including a substrate assembly 20 according to the first embodiment is avoided to prevent the external leads 31 from being shorted, even in extreme cases where a luminescent display panel is put into operation in an extremely hot and humid atmosphere.

Figure 5:
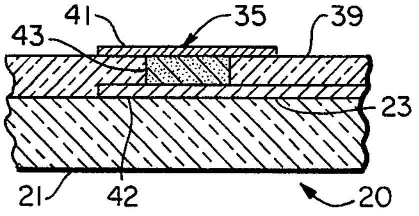
FIG. 5 is a like view of a substrate assembly according to a third embodiment of this invention.

Referring now to FIG. 5, a substrate assembly 20 according to a third embodiment of this invention comprises a segmented electrode 35 comprising, in turn, an electrode layer 41 of fired liquid gold, an electroconductive base layer 42 directly on the substrate 21, and a resistive layer 43 between the electrode and base layers 41 and 42. The electrode layer 41 is in direct contact with a mass of a luminescent material 37 (not shown for simplicity of illustration). The base layer 42 is in electrical contact with the associated electroconductive lead 23 and may be an integral part of the latter. The resistive layer 43 comprises powder of ruthenium(IV) oxide. The base layer 4 may be formed of silver or silver-palladium paste in a conventional manner. Alternatively, the base layer 42 and the associated conductive lead 23 may be an integral layer of fired liquid gold, In the example being illustrated, an insulator sheet 39 is deposited on the substrate 21 with holes formed therethrough at the positions of the segmented electrodes 35 by firing glass in a conventional manner. The resistive layers 43 are subsequently formed by filling each hole with a mixture of ruthenium (IV) oxide powder and a binder or flux, such as lead borosilicate glass, and firing the mixture at about 600° C. With a substrate assembly 20 according to the third embodiment, it is possible to raise the brightness of the display and to remove, when necessary, only the masses of luminescent material 37 without loss of the remaining parts of the substrate assembly 20.

Brightness and luminous efficiency of masses 37 of a luminescent material consisting essentially of zinc sulfide were measured with a fluorescent display panel having segmented electrodes 35 comprising fired liquid gold layers in direct contact with the zinc sulfide masses 37 in accordance with this invention and with a conventional fluorescent display panel having graphite layers 36 in the segmented electrodes 35. The results are as follows:

| | Fired liquid gold layer | Graphite layer |
|---|---|---|
| Heater voltage ($V_{ac}$) | 3.4 | 3.4 |
| Display electrode current (mA) | 1.1 | 1.0 |
| Brightness (cd . $m^{-2}$) | 89.3 | 74.0 |
| Luminous efficiency (cd . $m^{-2}$ . $mA^{-1}$) | 80.9 | 74.0 |

While a few preferred embodiments of this invention have thus far been described, it should be understood that a sheet of an insulating material 39 is not an essential element of a substrate assembly 20. Gold powder may be added to the liquid gold to raise the gold content of the fired liquid gold electrode layers. Although unnecessary, each of the fired liquid gold layers may be plated with gold in order to provide plated gold layers between the masses of luminescent material 37 and the fired liquid gold layers as is the case with the plated gold layers 36 in a conventional substrate assembly 20. When the luminescent masses 37 are disposed in indents formed in the substrate 21, the fired liquid gold layers may be extended along the side walls of the indents.

Figure 6:
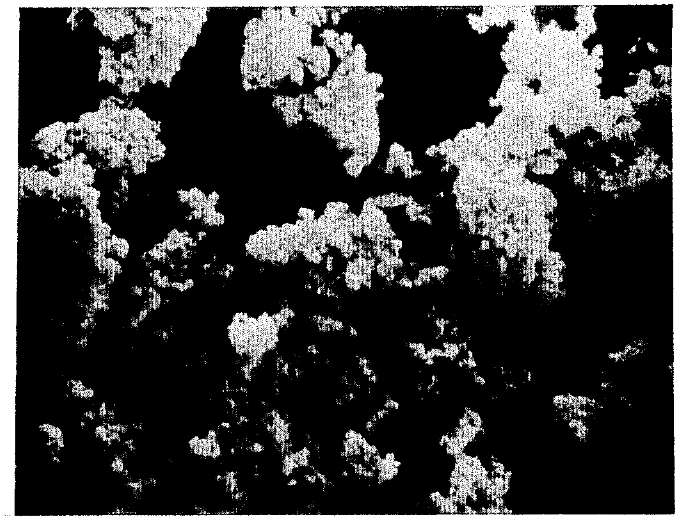
FIG. 6 is an electron micrograph of gold resinate for use in carrying this invention into effect.
Figure 7:
FIG. 7 is a further enlarged electron micrograph of the gold resinate.
Figure 8:
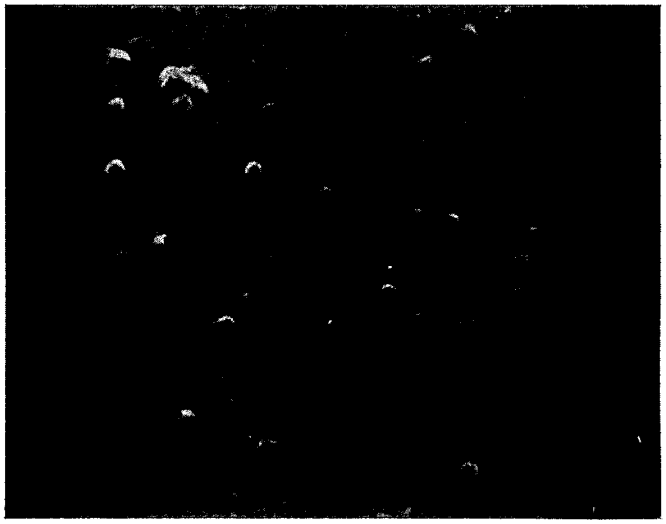
FIG. 8 is an electron micrograph of an electrode layer manufactured in accordance with this invention.
Figure 9:
FIG. 9 is a further enlarged electron micrograph of the electrode layer according to this invention.
Figure 10:
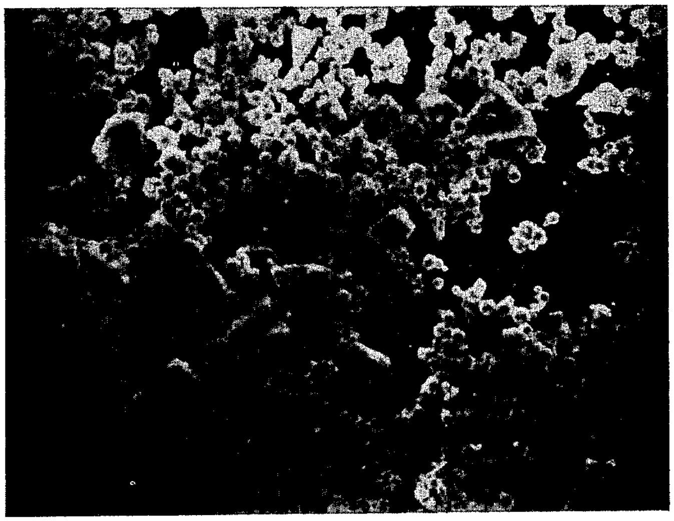
PRIOR ART FIG. 10
FIG. 10 is an electron micrograph of gold powder and frit particles for preparing conventional gold paste.
Figure 11:
PRIOR ART FIG. 11
FIG. 11 is an electron micrograph of a layer formed by the use of the conventionally prepared gold paste.

Finally referring to FIGS. 6 to 11, it should be understood at first that the fired liquid gold electrode layers comprise very fine particles of gold because they can be made thinner than about one micron. Although the sizes of the gold particles are not yet determined, gold resinate is shown in FIGS. 6 and 7 by electron micrographs with magnifications of 2,000 and 10,000, respectively. Electron micrographs shown in FIGS. 8 and 9 with magnifications of 2,000 and 10,000, respectively, clearly proove that the electrode layers made from the gold resinate shown in FIGS. 6 and 7 comprise very fine gold particles. Furthermore, gold powder and several frit particles for preparing conventional gold paste and a fired layer of the gold paste are shown in FIGS. 10 and 11, respectively, both with a magnification of 2,000, for reference. All micrographs were taken by a scanning electron microscope.

What is claimed is:

1. In a substrate assembly for a luminescent display panel comprising a substrate of an electrically insulating material, a plurality of segmented electrodes on said substrate, masses of a luminescent material on said segmented electrodes, respectively, and a plurality of electroconductive leads for said segmented electrodes on said substrate, the improvement wherein each of said segmented electrodes comprises an electrode layer of fired liquid gold.

2. A substrate assembly as claimed in claim 1, wherein said electrode layer is in direct contact with each of said masses of the luminescent material.

3. A substrate assembly as claimed in claim 2, wherein each of said segmented electrodes further comprises an electroconductive base layer directly on said substrate and a resistive layer between said base layer and the electrode layer of said each segmented electrode, the base layers being in electrical contact with said electroconductive leads, said resistive layer comprising powder of ruthenium(IV) oxide.

4. A substrate assembly as claimed in claim 3, further comprising a sheet of an electrically insulating material around the resistive layers and partly on said base layers and said substrate.

5. A substrate assembly as claimed in claim 4, wherein said resistive layer further comprises a binder for said ruthenium(IV) oxide powder and for said sheet.

6. A substrate assembly as claimed in claim 5, wherein said binder is lead borosilicate glass.

7. A substrate assembly as claimed in claim 2, wherein said electrode layer is in direct contact with said substrate.

8. A substrate assembly as claimed in claim 7, wherein said electrode layer is appreciably thinner than about ten microns.

9. A substrate assembly as claimed in claim 8, wherein said electrode layer is not thicker than about three microns.

10. A substrate assembly as claimed in claim 9, wherein said electrode layer is about one micron thick.

11. A substrate assembly as claimed in claim 7, wherein each of said electroconductive leads consists essentially of a lead layer of fired liquid gold, the lead layers being integral with the electrode layers.

12. A substrate assembly as claimed in claim 11 wherein said lead layer is appreciably thinner than about ten microns.

13. A substrate assembly as claimed in claim 12, wherein said lead layer is not thicker than about three microns.

14. A substrate assembly as claimed in claim 13, wherein said lead layer is about one micron thick.

* * * * *